United States Patent [19]
Sato et al.

[11] Patent Number: 6,144,769
[45] Date of Patent: Nov. 7, 2000

[54] VIDEO CODING DEVICE AND DECODING DEVICE

[75] Inventors: Seiji Sato, Toride; Keiichi Hibi, Matsudo, both of Japan

[73] Assignee: Sharp Kabushiki Kaisha, Osaka, Japan

[21] Appl. No.: 08/937,619

[22] Filed: Sep. 25, 1997

[30] Foreign Application Priority Data

Sep. 27, 1996 [JP] Japan .................................. 8-255635

[51] Int. Cl.⁷ .................................................. G06K 9/00
[52] U.S. Cl. .......................................... 382/236; 382/240
[58] Field of Search .................................... 382/232, 233, 382/234, 235, 236, 238, 239, 240, 241, 242, 243, 244, 245, 246, 248, 251, 252, 253, 190; 348/401, 408, 416, 402, 407, 413, 398, 422, 420, 384, 390, 12; 345/433; 386/124; 455/5.1

[56] References Cited

U.S. PATENT DOCUMENTS

| | | | |
|---|---|---|---|
| 5,394,249 | 2/1995 | Shimoda et al. ........................ | 358/335 |
| 5,602,589 | 2/1997 | Vishwanath et al. .................... | 348/398 |
| 5,731,840 | 3/1998 | Kikuchi et al. .......................... | 348/416 |
| 5,740,283 | 4/1998 | Meeker .................................... | 382/248 |
| 5,912,706 | 6/1999 | Kikuchi et al. ........................... | 348/401 |

FOREIGN PATENT DOCUMENTS 61-05300  4/1994  Japan ............................. H04N 7/137

*Primary Examiner*—B. Tadayon

[57] ABSTRACT

A video coding and decoding device for encoding and decoding video signal by dividing the video signal by dividing the video signal into frequency bands in advance of coding, wherein the timing of refreshing respective frequency bands independently controlled, so as to realize sequential periodical refreshment of every frequency bands, and an increase in refresh-rate for lower-frequency bands. A refresh-control portion determines the frequency bands to be refreshed, and then sends a refresh-command to coding mode selecting portions. Upon receipt of the refresh command, the coding mode selecting portions transfer intraframe-prediction coded information and interframe-prediction coded information.

9 Claims, 13 Drawing Sheets

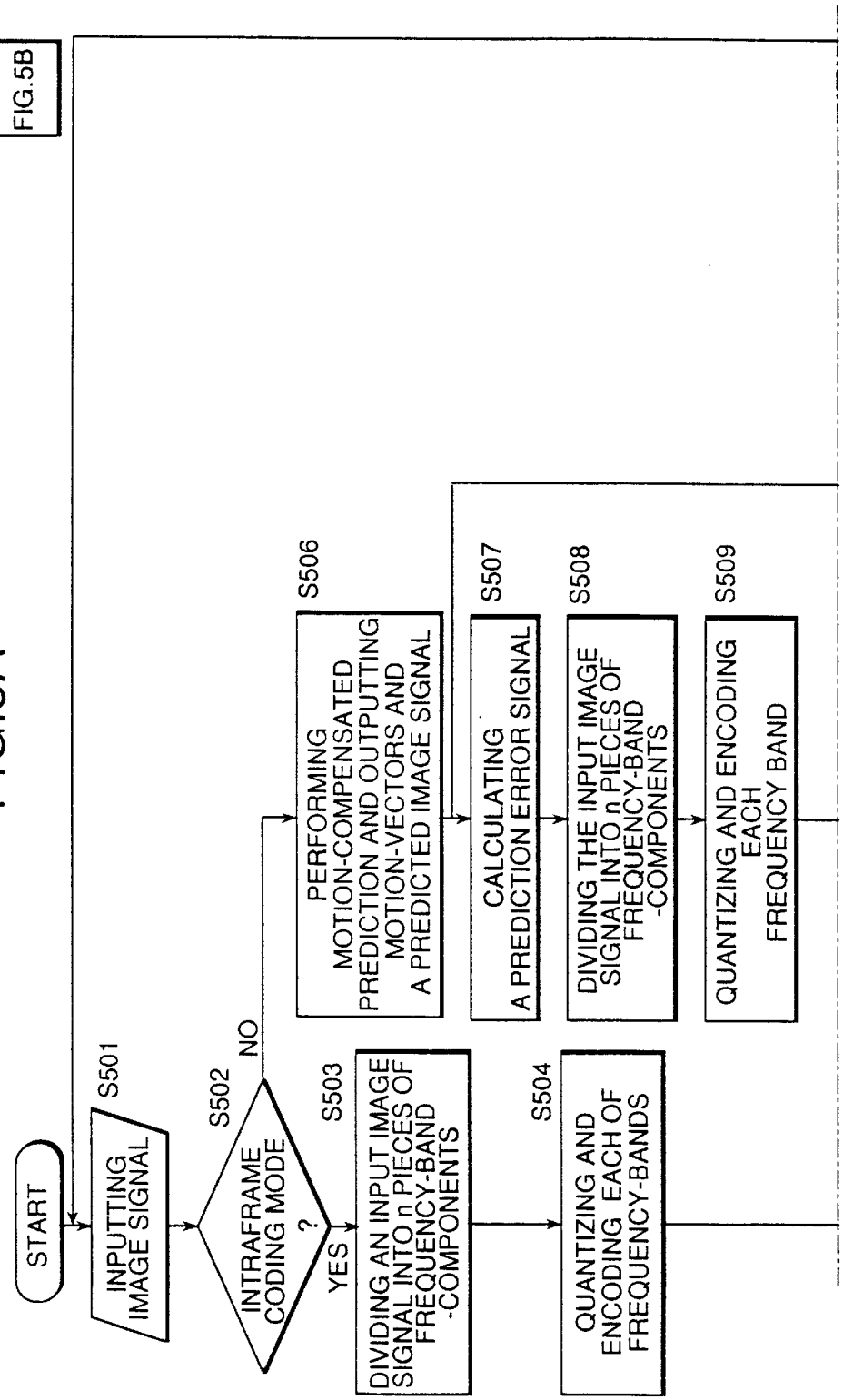

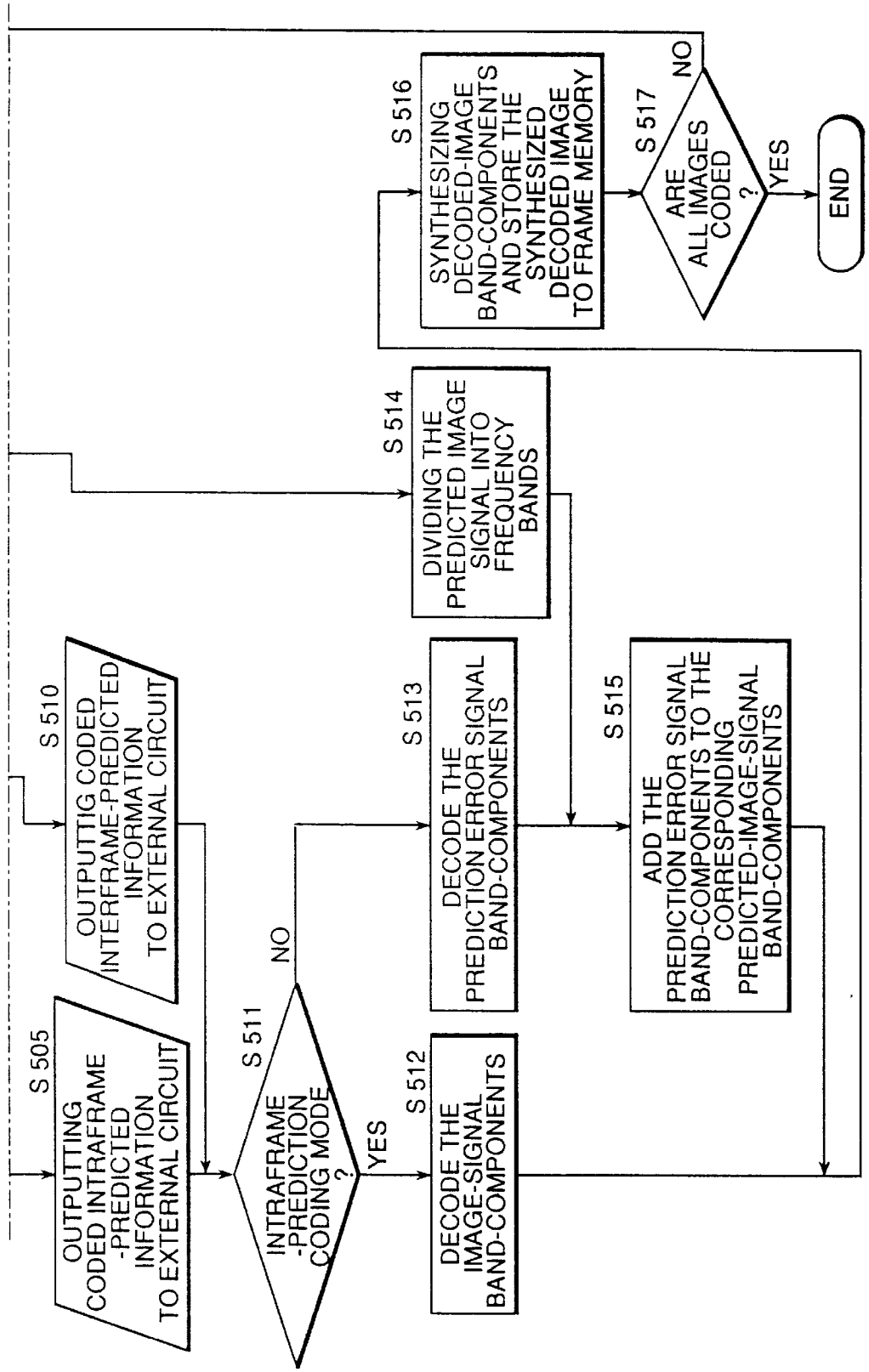

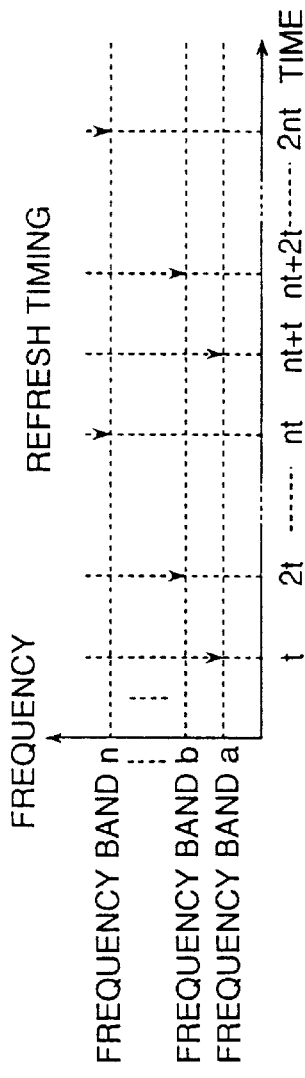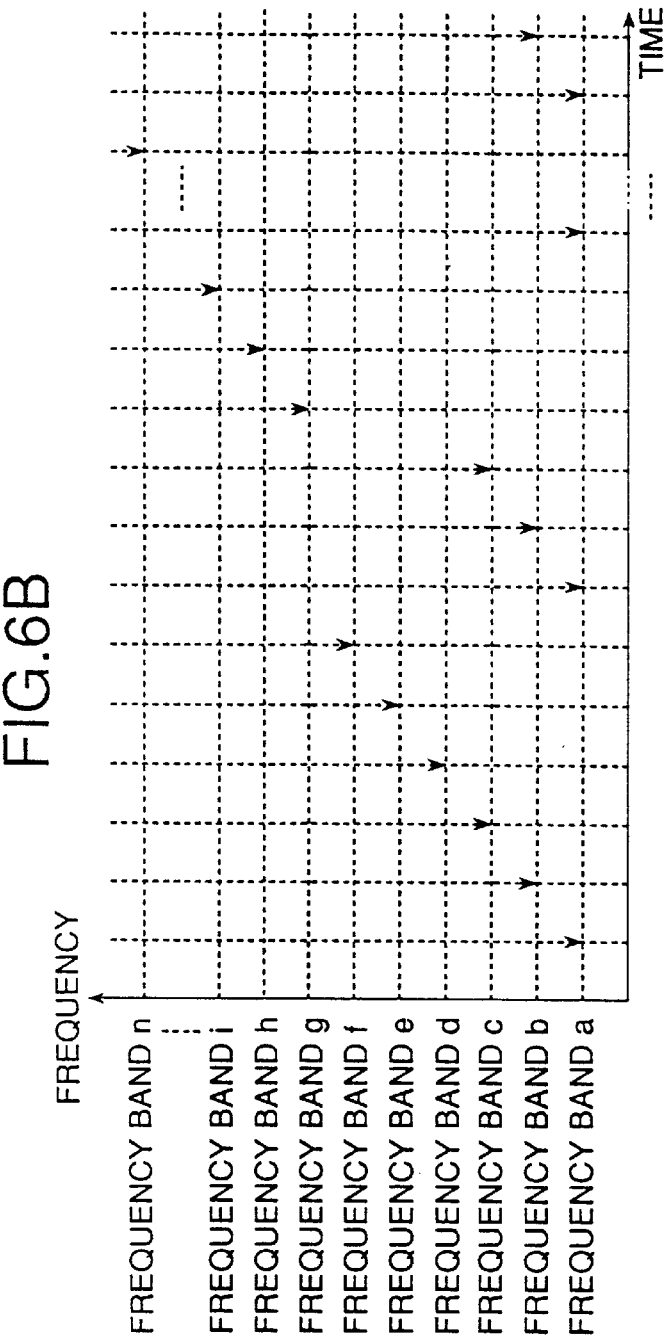

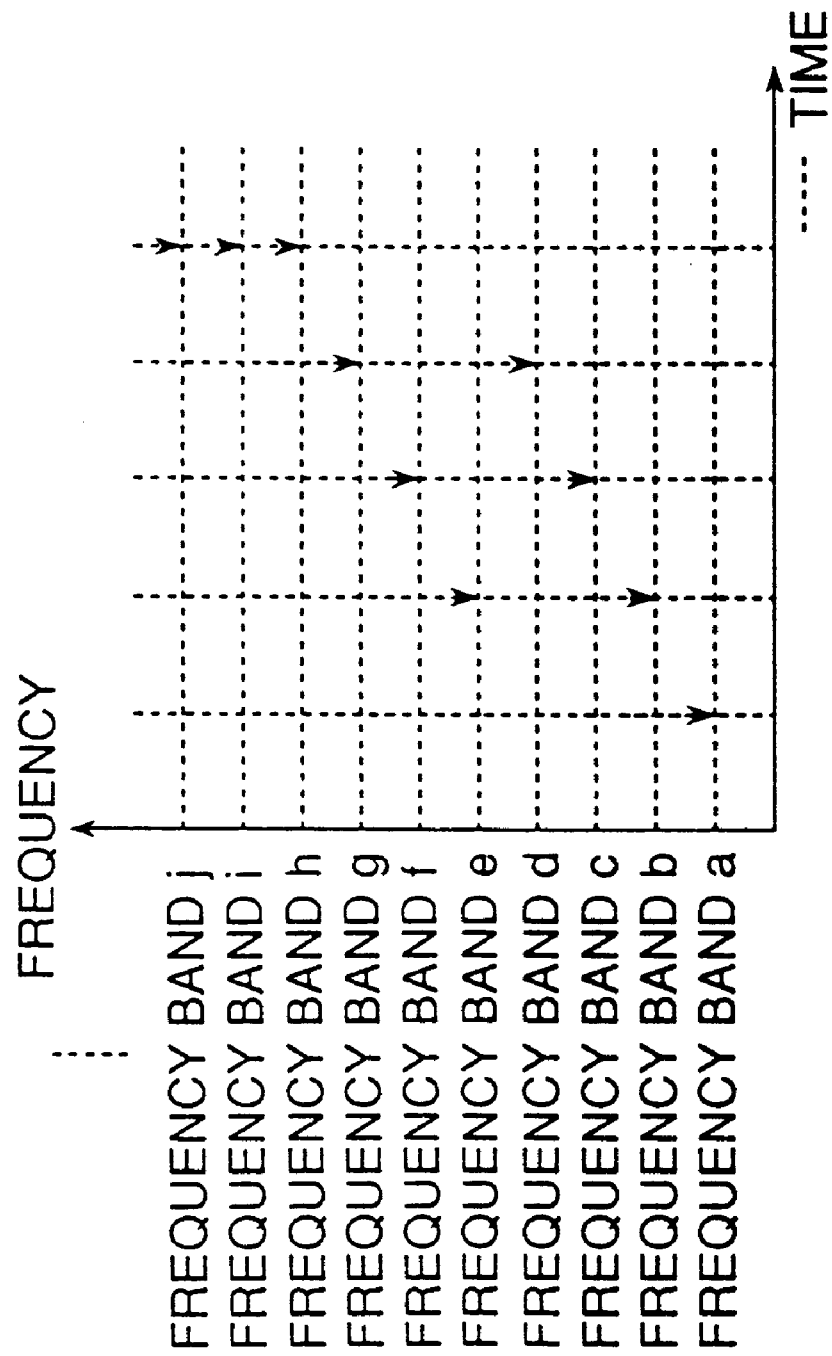

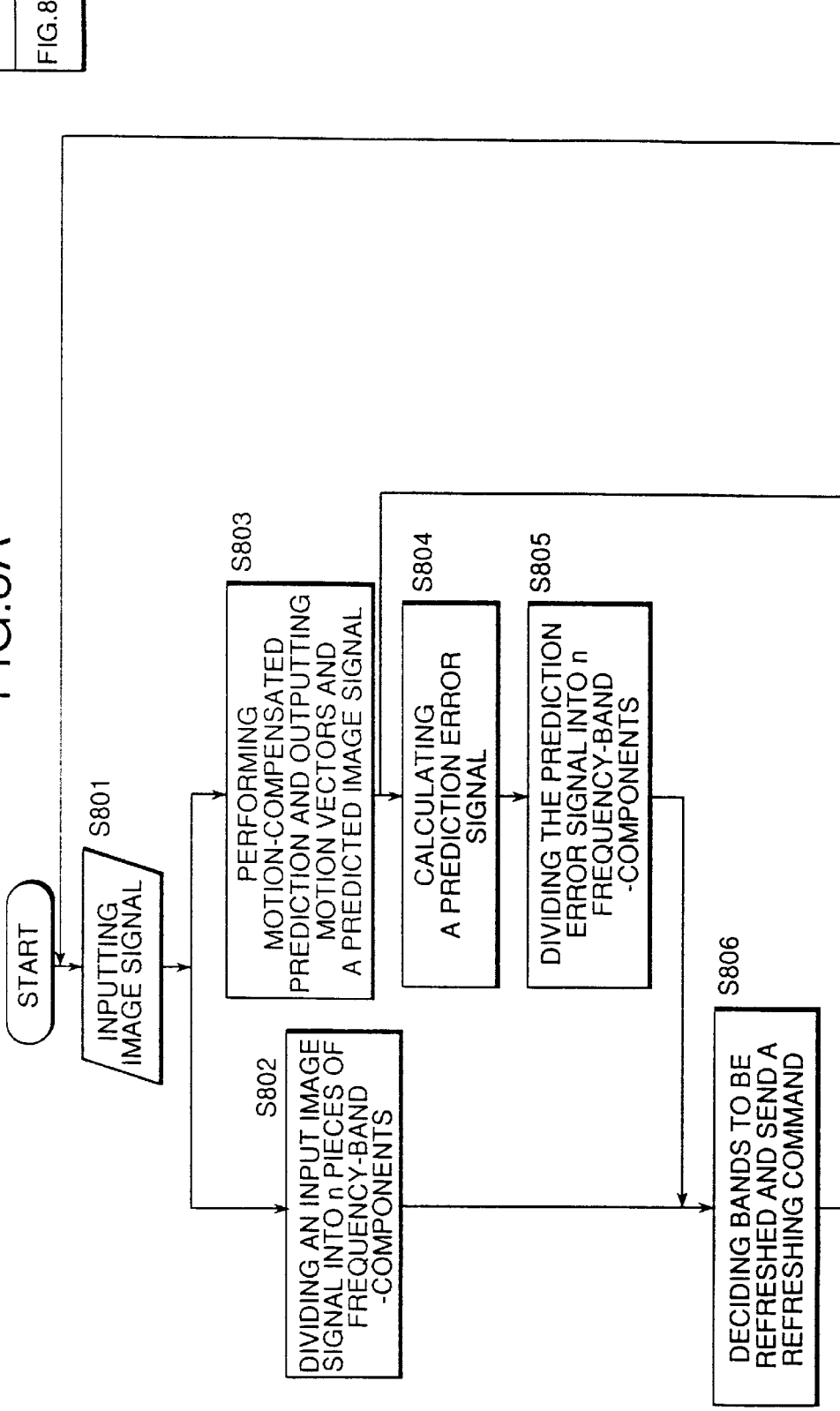

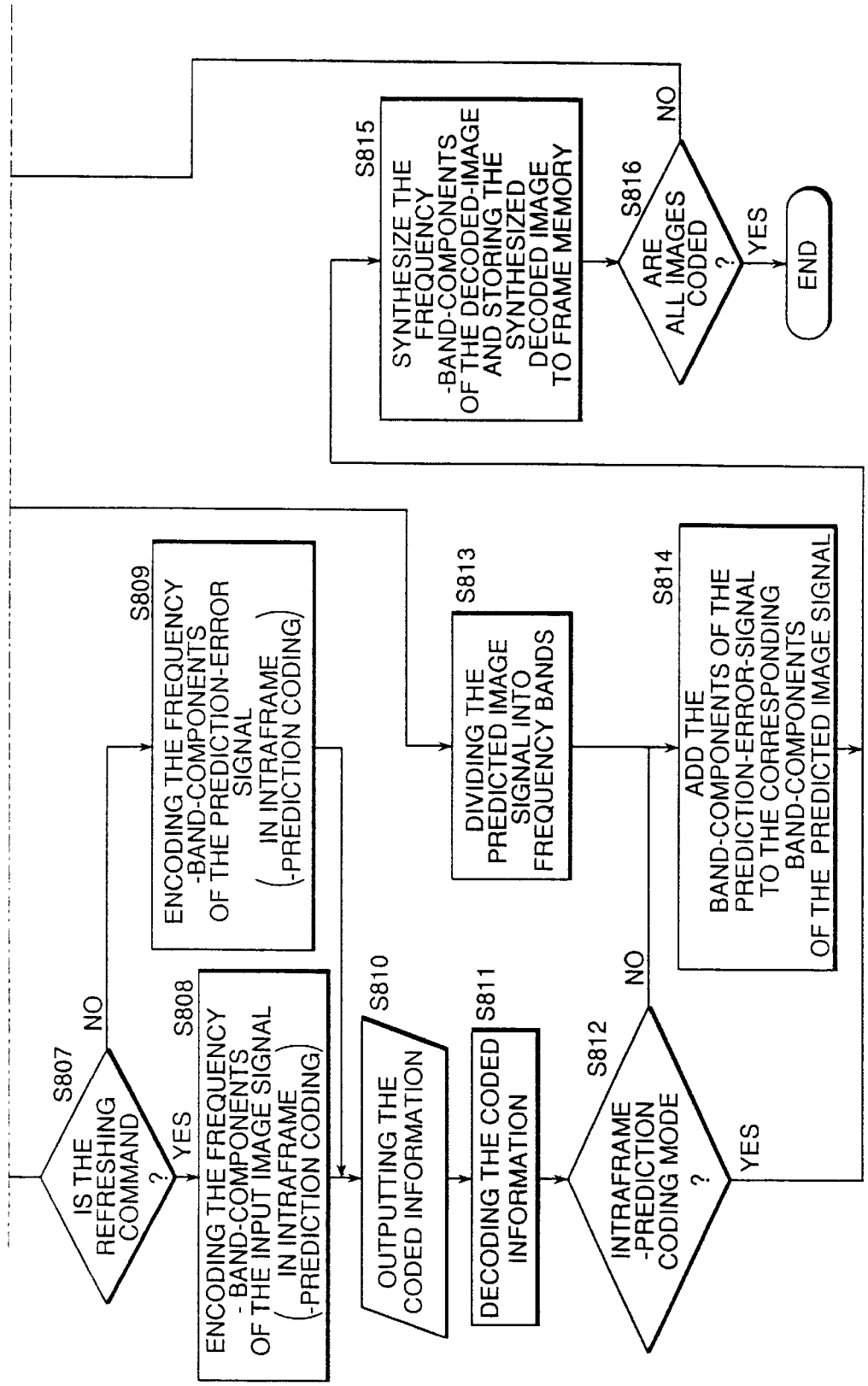

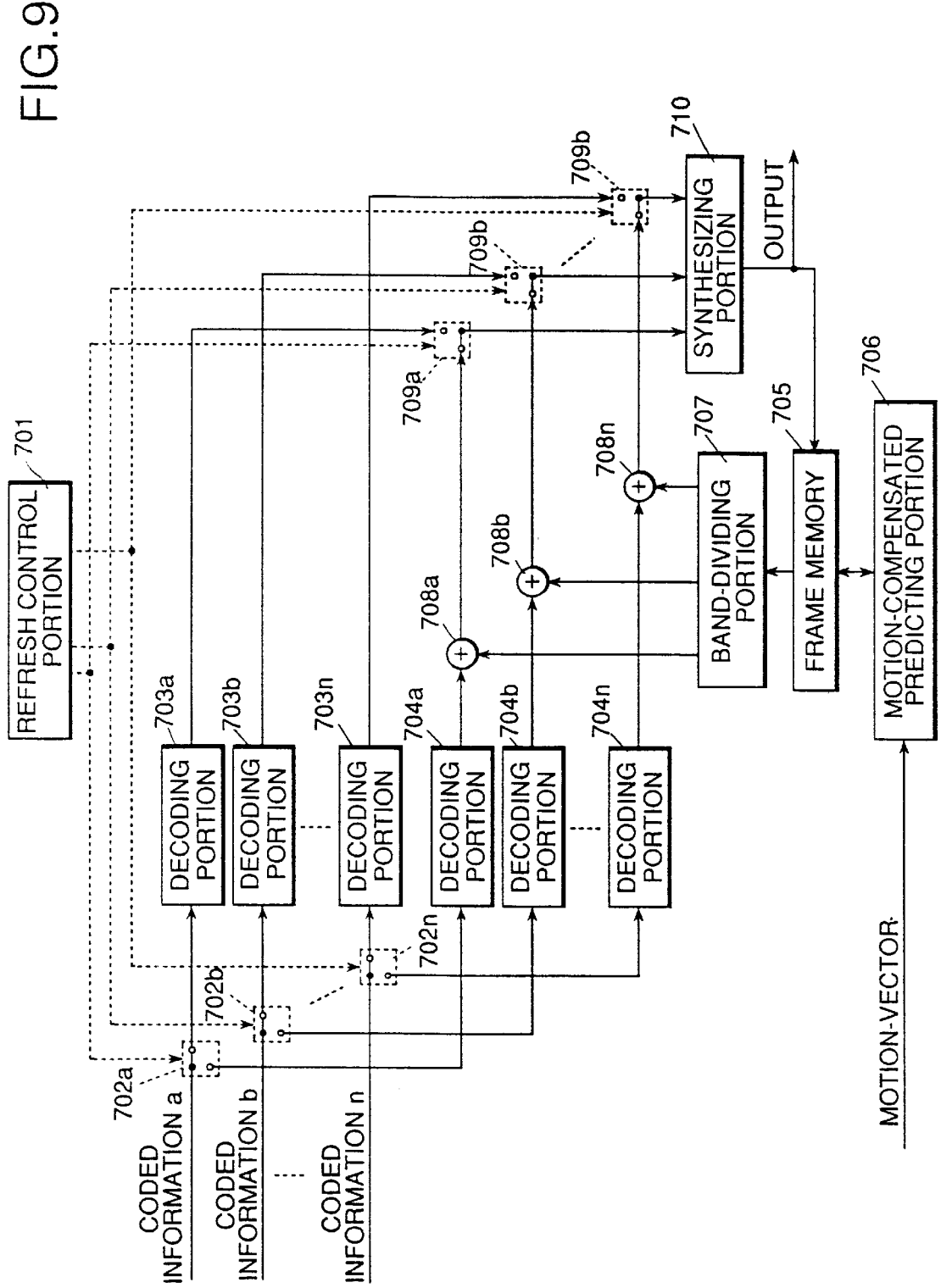

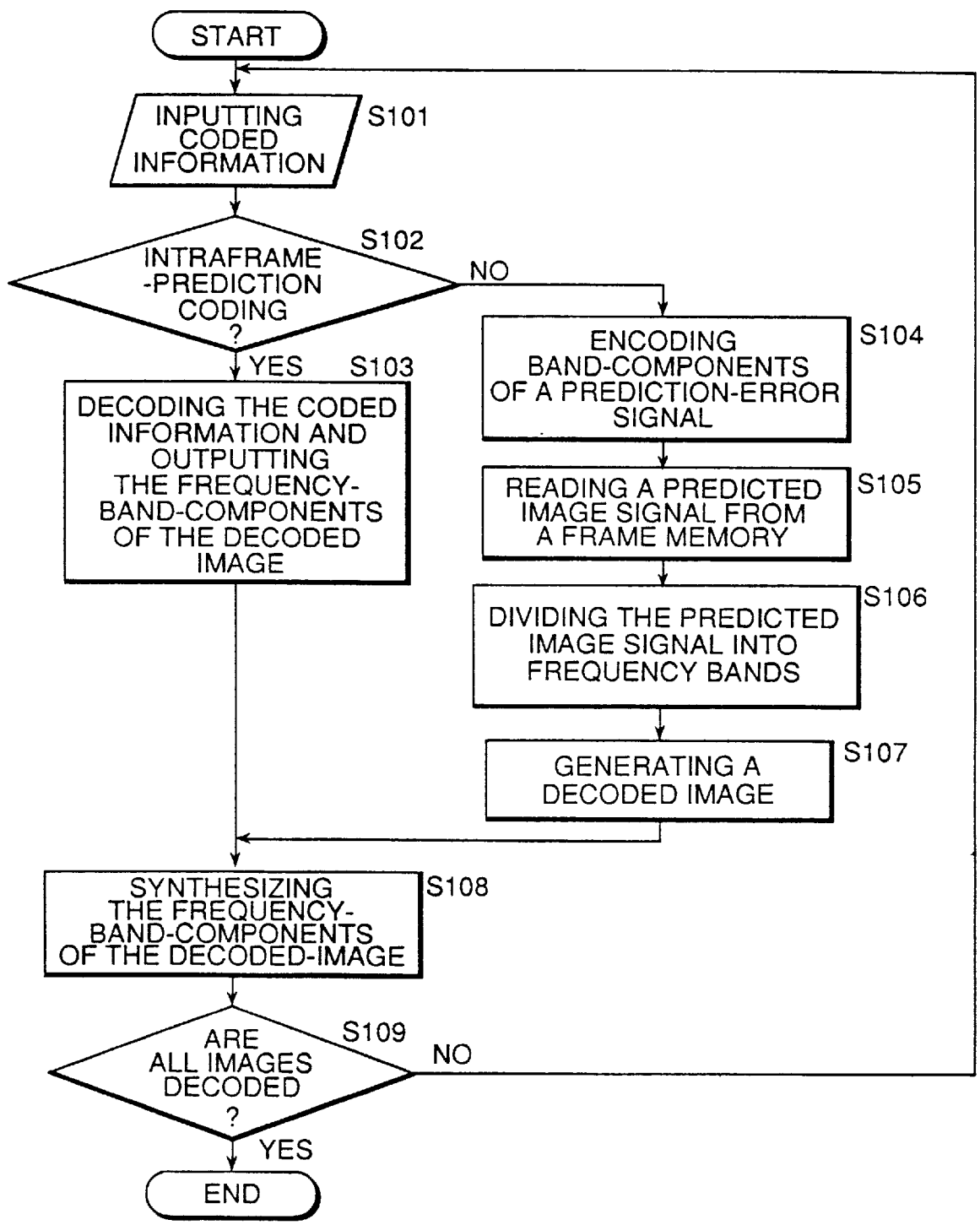

VIDEO CODING DEVICE AND DECODING DEVICE

BACKGROUND OF THE INVENTION

1. Field of the Invention

The present invention relates to video coding and decoding devices. More particularly, the invention is directed to a video coding device for hierarchically encoding a video sequence, and a video decoding device for decoding signals coded by the video coding device.

2. Description of Related Art

With recent developments of multimedia services, the image processing technique gets an increasing importance arid various kinds of studies have been made in various fields of applications.

In general, video information contains a very large amount of information. Accordingly, it is impossible to practically transmit video information as it is, since a transmission line with a very wide-band transmission capacity is required. On the other hand, a video signal contains redundances which need to be reduced. Therefore, a coding or a compression coding technique is widely used for treating video signals at high efficiency.

In a conventional video coding device using an interframe predictive orthogonal transform coding method, a motion-compensated interframe-predicting portion encodes input video signals per frame by motion-compensated interframe-predicting method and outputs motion-vectors. Namely, the motion-compensated interframe-predicting portion reads a preceding video frame image, predicts a motion-compensated video frame image from a current input video frame image and the read preceding video frame image and outputs a predicted video signal, which was encoded, decoded and then stored in a frame memory portion. A difference calculating portion determines a prediction error signal that is a difference between the input video signal and the predicted video signal read from the frame memory portion, thus eliminating temporal redundancy from the signal to be encoded.

The prediction error signal outputted from the difference calculating portion is transferred to an orthogonal transforming portion whereby said signal is orthogonally transformed and removed off spatial redundancy. In consequence of this processing, a transformation coefficient is outputted.

The transformation coefficient from the orthogonal transforming portion is quantized and encoded with a compressed amount of information by a coding portion.

The output signal from the coding portion is transferred as coded information to an external circuit and a decoding portion.

The decoding portion performs processing operations in a reverse fashion as compared to those performed by the coding portion and outputs the transformation coefficient to a reverse orthogonal transforming portion that in turn conducts reverse orthogonal transformation of the received transformation coefficient.

The output signal from the reverse orthogonal transforming portion is added to the predicted video signal read from the frame memory portion by an adding portion. The resultant signal is stored in the frame memory portion and will be used for interframe prediction of a next input video signal.

Input video signals are thus encoded by a loop structure (coding loop).

As described above, the conventional video coding device is capable of efficiently encoding video sequence by previously eliminating temporal redundancy of image information through motion-compensated prediction and spatial redundancy through orthogonal transformation. However, the conventional coding method encodes a video sequence frame by frame and, therefore, coded image information by the conventional coding method cannot be correctly decoded for a whole image if an image signal should be subjected to a transmission error or loss of information in a transmission line.

Furthermore, the conventional method uses the interframe prediction coding technique, and therefore incurs a problem of handing down an incorrectness occurred in a prior decoded image to all subsequent frames to be encoded.

These problems may be solved by applying a hierarchical coding method that arranges image signals in a hierarchy and encodes signals of each hierarchical layer separately from each other. Namely, when incorrect decoding occurred in a hierarchical layer of image signals, this method can minimize the impairment of decoded images by only decoding signals of other correct layers.

In a hierarchical video coding device using divided frequency bands, similarly to the above-described conventional method, an input video sequence is encoded frame by frame by a motion-compensated interframe-predicting portion and a prediction error signal per frame is outputted from a difference calculating portion.

The prediction-error signal from the difference calculating portion is divided into a plurality of frequency bands and outputted in bands respectively by a band-dividing portion. The band-components of the prediction error signal, which were outputted from the band-dividing portion, are encoded separately from one another by coding portions respectively. Encoded information is outputted to an external circuit and corresponding decoding portions.

The decoding portions performs processing operations reverse to those performed by the coding portions from which respective band components of the prediction-error signal are outputted.

On the other hand, a predicted image signal read from a frame memory is divided into frequency bands and outputted as respective frequency-band-components by a band dividing portion.

The frequency-band-components of the predicted image signal from the band dividing portion are added to the corresponding frequency-band-components of the prediction-error signal from the decoding portions by an adding portion respectively. The obtained frequency-band-components of a decoded image signal are outputted respectively.

These frequency-band-components of the decoded image signal are synthesized to form a decoded image signal (through processing operations reverse to those performed by the band dividing portion) by a synthesizing portion. The decoded image signal is stored in the frame memory portion and will be used for interframe prediction of a next input image signal.

According to the above-mentioned processing method, it is possible to minimize degradation of a video sequence due to an error or a loss in information transmitted over a transmission line since a decoding error occurred in a certain frequency-band-component may be confined in said frequency band.

However, when transmission error and/or a loss of information occurs in a transmission line, the above-mentioned conventional hierarchical coding device can enclose the decoding error within a hierarchical layer but cannot completely prevent said error from propagating to subsequent images.

SUMMARY OF THE INVENTION

The present invention relates to a video coding device for compression encoding a video signal by reducing redundant data contained therein and a video decoding device for decoding said compressed coded video signal and, more particularly, relates to a video coding device for hierarchically encoding a video sequence by previously performing motion-compensated interframe prediction of video frames, dividing an obtained prediction error signal into frequency-band-components and separately encoding each of the frequency-band-components and a video decoding device for decoding video signals coded by said video coding device.

The present invention is directed to solving the foregoing problems involved in the prior arts.

Accordingly, an object of the present invention is to provide a video-coding device and a video-decoding device, which are capable of assuring a necessary quality of a video sequence even if a transmission error and/or a loss of information occurs in a transmission line and preventing the propagation of decoding error to subsequent images.

Another object of the present invention is to provide a video coding device provided with a hierarchical refreshing control portion means, which obtains a prediction error signal through performing motion-compensated interframe-prediction of digital video signals, divides the obtained prediction error signal into several frequency-band-components and encodes each of the frequency-band-components by changing-over the prediction mode from intraframe prediction to intraframe prediction and vice versa in each frequency band.

Another object of the present invention is to provide a video coding device wherein the hierarchical refreshing control portions independently controls changing-over of coding mode from intraframe prediction to interframe prediction and vice versa in each frequency band.

Another object of the present invention is to provide a video coding device wherein the hierarchical refreshing control portion periodically changes frequency-band-components to be refreshed one another for evenly refreshing every frequency band.

A further object of the present invention is to provide a video coding device wherein the hierarchical refreshing control portion adaptively changes a refresh rate for each frequency band.

A still further object of the present invention is to provide a video coding device wherein the hierarchical refreshing control portion adaptively selects hierarchical layers so that they may be refreshed at a substantially constant amount of codes.

Another object of the present invention is to provide a video decoding device provided with hierarchical refreshing decoding portion, which decodes coded information in each frequency-band-component by changing-over the decoding mode from intraframe prediction to interframe prediction and vice versa.

The use of the refresh-control means makes it possible to do the intraframe prediction coding of each frequency-band-component, thus efficiently preventing the propagation of decoding error.

Independent control of each frequency-band-component makes it possible to efficiently encode and transmit only necessary frequency-band-components.

Furthermore, any transmission error in any frequency band can be periodically eliminated by evenly refreshing respective frequency band.

A refresh-rate can be controlled for each frequency band. This makes it possible to improve a quality of a decoded image subjectively by increasing a rate of refreshing, e.g., a low-frequency band.

It is also possible to restrain a change in an amount of codes for a refreshing cycle by adaptively selecting frequency band to be refreshed so as to attain a constant amount of codes.

BRIEF DESCRIPTION OF DRAWINGS

FIG. 5 shows the correct alignment of the drawing sheets for FIGS. 5A and 5B.

FIG. 5A is a flow chart (part 1) for explaining a, sequence of processing by the video coding device of FIG. 3.

FIG. 5B is a flow chart (part 2) for explaining a sequence of processing by the video coding device of FIG. 3.

FIG. 6A is a graph chart for explaining the operation of a hierarchical refreshing control portion of a video coding device according to the present invention.

FIG. 6B is a graph chart for explaining the operation of a hierarchical refreshing control portion of a video coding device according to the present invention.

FIG. 6C is a graph chart for explaining the operation of a hierarchical refreshing control portion of a video coding device according to the present invention.

FIG. 8 shows the correct alignment of the drawing sheets for FIGS. 8A and 8B.

FIG. 8A is a flow chart (part 1) for explaining a sequence of processing by the video coding device of FIG. 7.

FIG. 8B is a flow chart (part 2) for explaining a sequence of processing by the video coding device of FIG. 7.

FIG. 9 is a construction block-diagram of a video decoding device embodying the present invention.

FIG. 10 is a flow chart for explaining a sequence of processing by the video decoding device of FIG. 9.

PREFERRED EMBODIMENTS OF THE INVENTION

Prior to explaining preferred embodiments of the present invention, a video coding device and decoding device basic art on which the present invention stand, will be described below as references for the present invention.

With recent developments of multimedia services, image processing techniques have gained an increasing importance and various kinds of studies have been made in various fields of applications.

In general, video information contains a very large amount of information. Accordingly, it is impossible to practically transmit video information as it is because of necessity of a transmission line with a very wide-band transmission capacity. On the other hand, a video signal contains redundancy to be reduced. Therefore, a coding or a compression coding technique is widely used for treating video signals at high efficiency.

Figure 1:
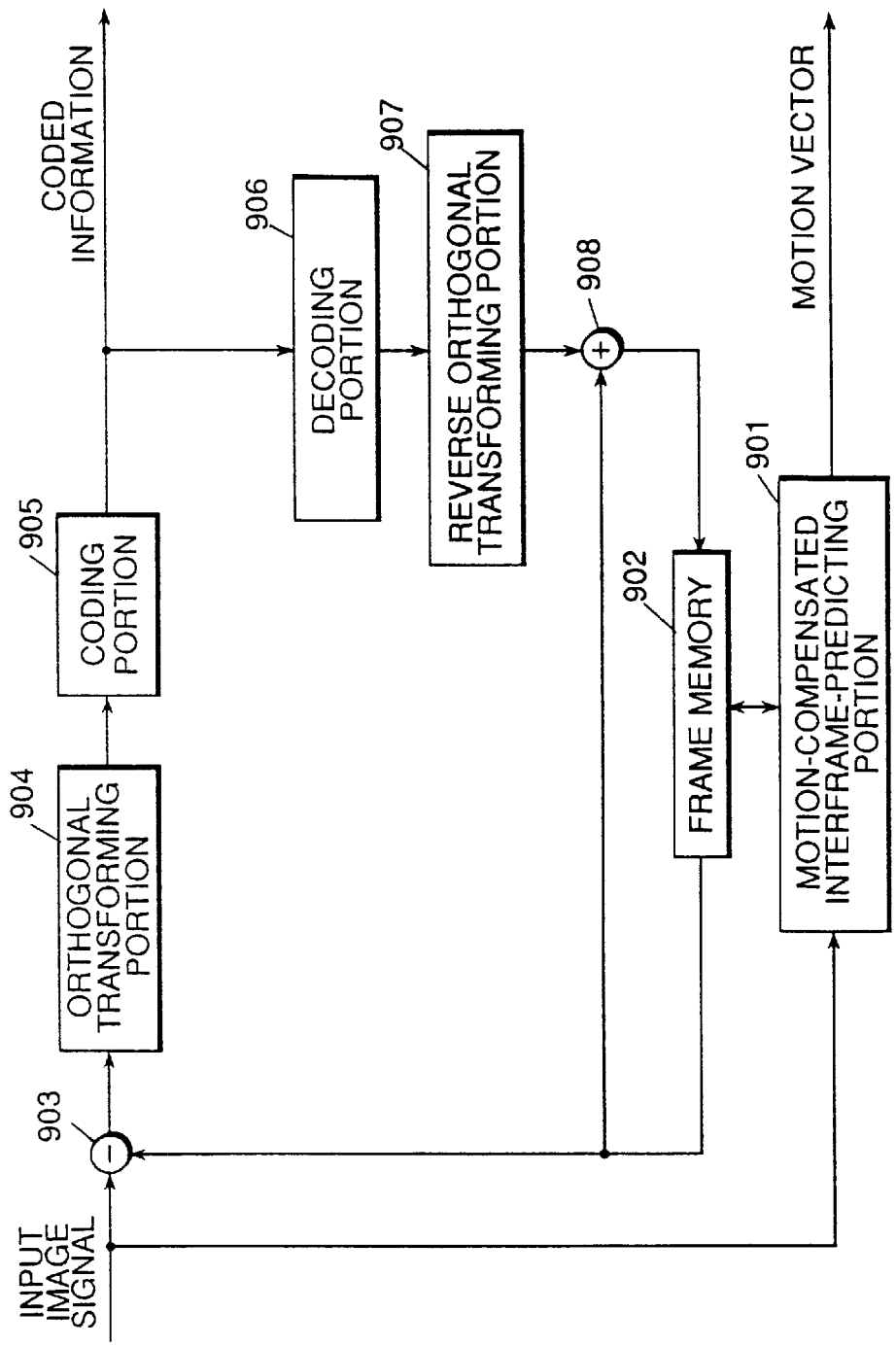
FIG. 1 is a construction block-diagram of a video coding device using a prior art interframe prediction coding method.

FIG. 1 shows a construction of a conventional video coding device using an interframe predictive orthogonal transform coding method. As shown in FIG. 1, a motion-compensated interframe-predicting portion 901 encodes input video signals per frame by motion-compensated interframe-predicting method and outputs motion-vectors. Namely, the motion-compensated interframe-predicting portion 901 reads a preceding video frame image, predicts a motion-compensated video frame image from a current input video frame image and the read preceding video frame image and outputs a predicted video signal, which was encoded, decoded and then stored in a frame memory portion 902. A difference calculating portion 903 determines a prediction error signal that is a difference between the input video signal and the predicted video signal read from the frame memory portion 902, thus eliminating temporal redundancy from the signal to be encoded.

The prediction error signal outputted from the difference calculating portion 903 is transferred to an orthogonal transforming portion 904 whereby said signal is orthogonally transformed and removed off spatial redundancy. In consequence of this processing, a transformation coefficient is outputted.

The transformation coefficient from the orthogonal transforming portion 904 is quantized and encoded with a compressed amount of information by a coding portion 905.

The output signal from the coding portion 905 is transferred as coded information to an external circuit and a decoding portion 906.

The decoding portion 906 performs processing operations reverse to those performed by the coding portion and outputs the transformation coefficients to a reverse orthogonal transforming portion 907 that in turn conducts reverse orthogonal transformation of the received transformation coefficients.

The output signal from the reverse orthogonal transforming portion 907 is added to the predicted video signal read from the frame memory portion 902 by an adding portion 908. The resultant signal is stored in the frame memory portion 902 and will be used for interframe prediction of a next input video signal.

Input video signals are thus encoded by a loop structure (coding loop).

As described above, the conventional video coding device is capable of efficiently encoding video sequence by previously eliminating temporal redundancy of image information through motion-compensated prediction and spatial redundancy through orthogonal transformation. However, the conventional coding method encodes a video sequence frame by frame and, therefore, coded image information by the conventional coding method cannot be correctly decoded a whole image if an image signal should be subjected to a transmission error or loss of information in a transmission line.

Furthermore, the conventional method uses the interframe prediction coding technique and therefore involves a problem of handing down an incorrectness occurred in a decoded image to all subsequent frames to be encoded.

These problems may be solved by applying a hierarchical coding method that arranges image signals in a hierarchy and encodes signals of each hierarchical layer separately from each other. Namely, when incorrect decoding occurred in a hierarchical layer of image signals, this method can minimize the impairment of decoded images by only decoding signals of other correct layers.

Figure 2:
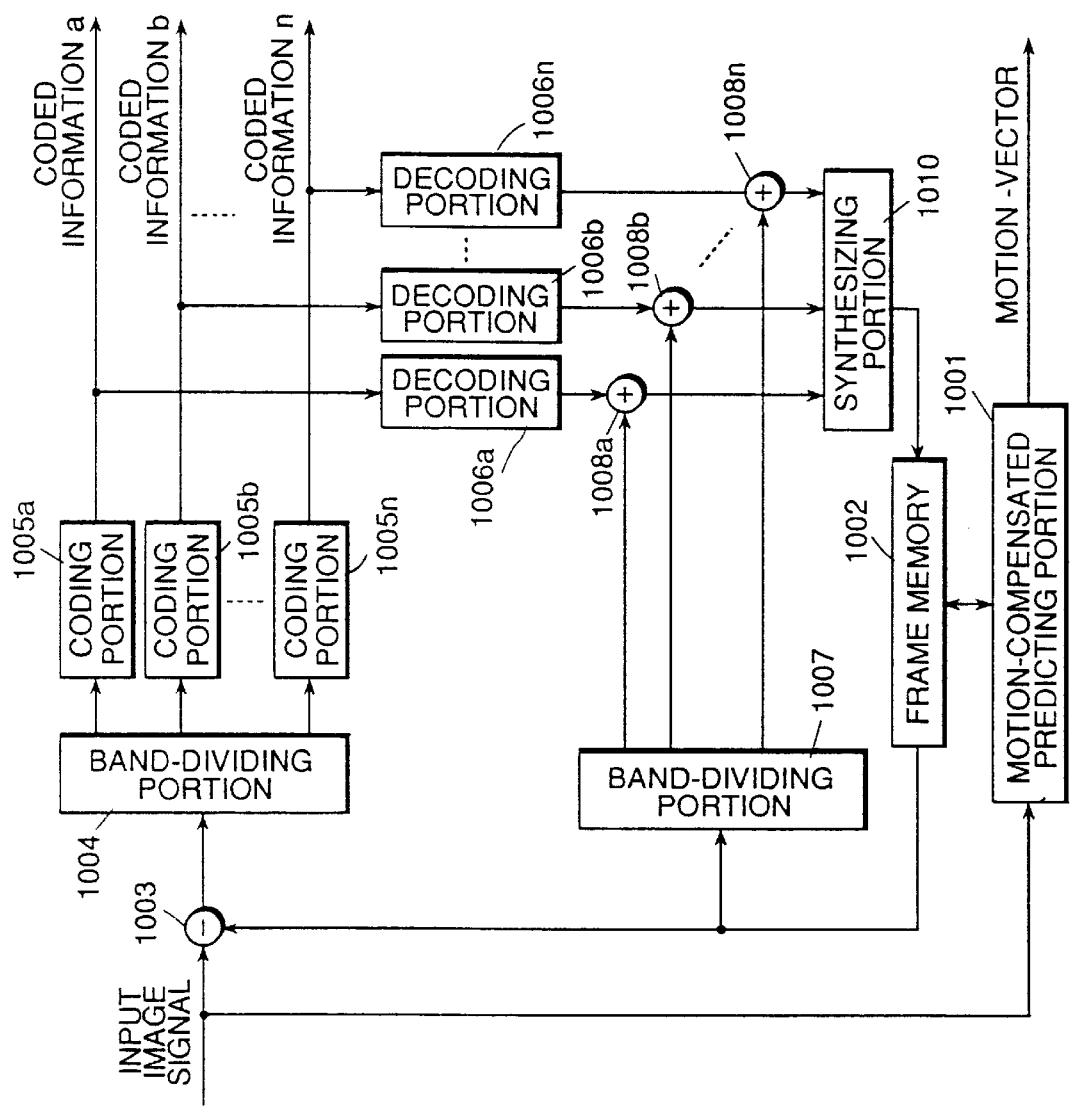
FIG. 2 is a construction block-diagram of a hierarchical video-coding device (prior art) using a frequency band dividing method.

Referring to FIG. 2, a hierarchical video coding device using divided frequency bands will be, by way of example, described.

Similarly to the above-described conventional method, an input video sequence is encoded frame by frame by a motion-compensated interframe-predicting portion 1001 and a prediction error signal per frame is outputted from a difference calculating portion 1003.

The prediction-error signal from the difference calculating portion 1003 is divided into a plurality of frequency bands and outputted in bands respectively by a band-dividing portion 1004. The band-components of the prediction error signal, which were outputted from the band-dividing portion 1004, are encoded separately from one another by coding portions 1005a to 1005n respectively. Encoded information (a to n) is outputted to an external circuit and corresponding decoding portions 1006a to 1006n.

The decoding portions 1006a to 1006n performs processing operations reverse to those performed by the coding portions 1005a to 1005n from which respective band components of the prediction-error signal are outputted.

On the other hand, a predicted image signal read from a frame memory 1002 is divided into frequency bands and outputted as respective frequency-band-components by a band-dividing portion 1007.

The frequency-band-components of the predicted image signal from the band-dividing portion 1007 are added to the corresponding frequency-band-components of the prediction-error signal from the decoding portions 1006a to 1006n by an adding portion 1008a to 1008n respectively. The obtained frequency-band-components of a decoded image signal are outputted respectively.

These frequency-band-components of the decoded image signal are synthesized to form a decoded image signal (through processing operations reverse to those performed by the band dividing portion) by a synthesizing portion 1010. The decoded image signal is stored in the frame memory portion 1002 and will be used for interframe prediction of a next input image signal.

According to the above-mentioned processing method, it is possible to minimize degradation of a video sequence due to an error or a loss in information transmitted over a transmission line since a decoding error occurred in a certain frequency-band-component may be confined in said frequency band.

However, when transmission error and/or a loss of information occurs in a transmission line, the above-mentioned conventional hierarchical coding device can enclose the decoding error within a hierarchical layer but cannot completely prevent said error from propagating to subsequent images.

Referring to accompanying drawings, a video-coding device and a video decoding device according to the present invention will be described below in detail.

Figure 3:
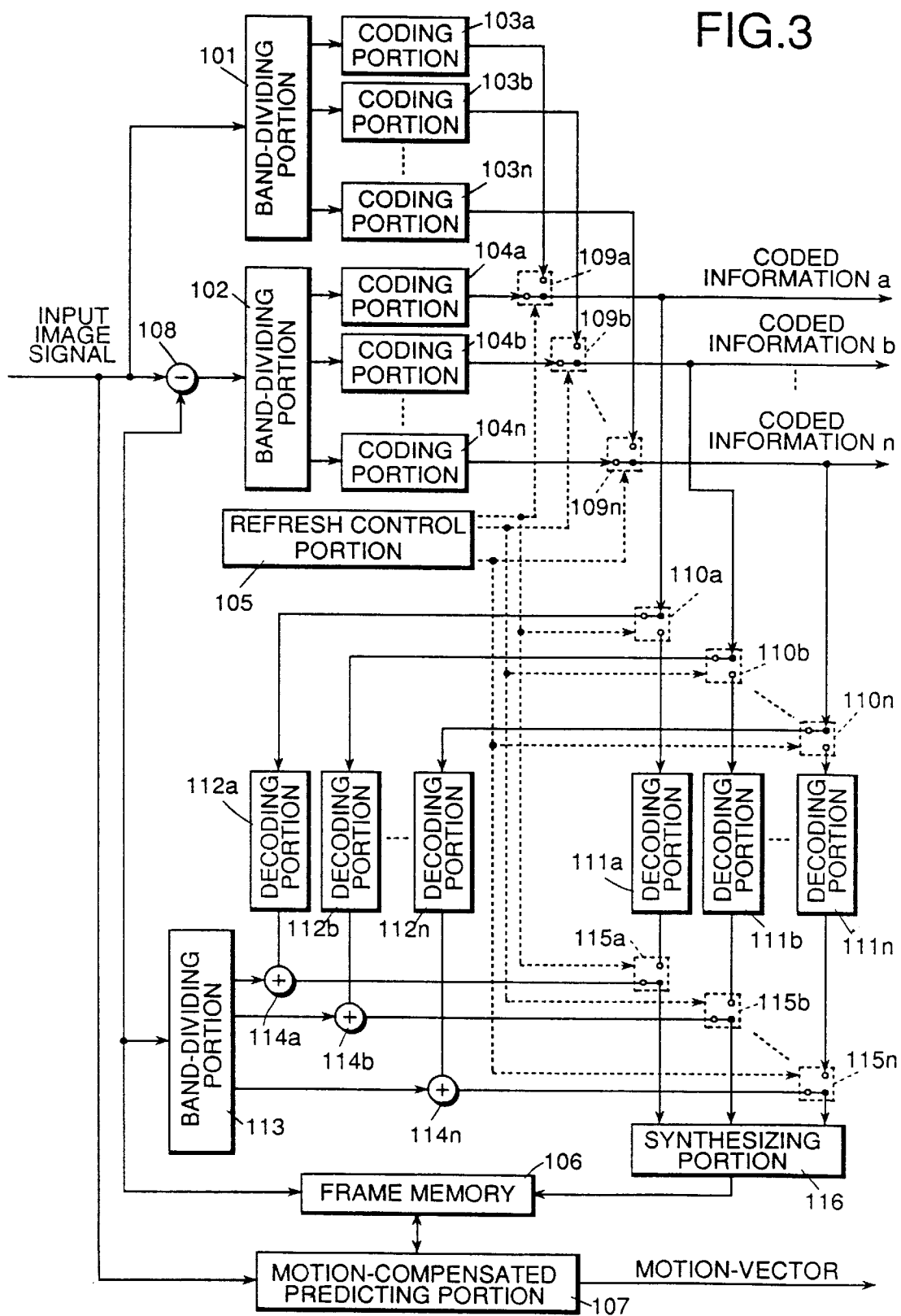
FIG. 3 is a construction block-diagram of a video coding device provided with hierarchical refresh control portion, which device is a first embodiment of the present invention.

FIG. 3 depicts a video coding device which is a first embodiment of the present invention.

As shown in FIG. 3, the first embodiment of the present invention comprises an input-image-signal band-dividing portion 101, a prediction-error-signal band-dividing portion 102, intraframe coding portions 103a to 103n, interframe coding portions 104a to 104n, a refresh control portion 105, a frame memory portion 106, a motion-compensated interframe-predicting portion 107, a difference calculating portion 108, coding mode selecting portions 109a to 109n and 110a to 110n, intraframe decoding portions 111a to 111n, interframe decoding portions 112a to 112n, a predicted-image-signal band-dividing portion 113, adding portions 114a to 114n, decoded signal selecting portions 115a to 115n and a synthesizing portion 116.

The above-mentioned portions of the first embodiment are described below in detail.

The input-image-signal band-dividing portion 101 divides an input image signal into n frequency-band-components and outputs the frequency-band-components one by one to the intraframe coding portions 103a to 103n. The prediction-error-signal band-dividing portion 102 receives a prediction error signal (to be described later) from the difference calculating portion 108, divides the signal into n frequency-band-components and outputs the frequency-band-components one by one to the interframe coding portions 104a to 104n.

The intraframe coding portions 103a to 103n receive the corresponding frequency-band-components from the input-image-signal band-dividing portion 101, quantize and encode the received frequency-band-components and output intraframe coded information of the respective frequency band.

The interframe coding portions 104a to 104n receive the corresponding frequency-band-components of the prediction error signal from the prediction-error-signal band-dividing portion 102, quantize and encode the received frequency-band-components and output coded information obtained through performing interframe-prediction in the respective frequency bands.

The refresh control portion 105 decides coding mode (i.e., intraframe coding mode or interframe coding modes) for each of the frequency bands and, in the intraframe coding mode, outputs a refresh command to the coding-mode selecting portions 109a to 109n, 110a to 110n and the decoded signal selecting portions 115a to 115n. This refresh command is given for respective frequency bands. The method of sending the refresh command for each frequency band will be described later in detail.

The frame memory portion 106 stores an image signal coded and decoded just before the current input image signal.

The motion-compensated interframe-predicting portion 107 conducts motion-compensated prediction of the input image signal by reference to the preceding image signal that was coded, decoded and stored in the frame memory portion 106. This predicting portion 107 outputs motion vectors as a result and reads a prediction signal from the frame memory portion 106.

The difference calculating portion 108 determines a difference between the input image signal and the predicted signal read from the frame memory portion 106 and outputs the result as a prediction error signal to the prediction-error-signal band-dividing portion 102. The coding mode selecting portions 109a to 109n select either coded information from the intraframe coding portions 103a to 103n or coded information from the interframe coding portion 104a to 104n depending upon the presence or absence of a refresh command outputted from the refresh control portion 105 and output respective coded information (a to n) to an external circuit.

The coding-mode selecting portions 110a to 110n are interlocked with the coding-mode selecting portions 109a to 109n and output intraframe coded information to the intraframe decoding portions 111a to 111n in the intraframe coding mode or interframe coded information to the interframe decoding portions 112a to 112n in the interframe coding mode.

The intraframe decoding portions 111a to 111n decode the intraframe-coded information outputted from the coding mode selecting portions 110a to 110n and output respective frequency-band-components of the decoded image. The intraframe decoding portions 111a to 111n do not output any signal if no intraframe-coded information is sent from the coding mode selecting portions 110a to 110n.

The interframe decoding portions 112a to 112n decode the interframe-prediction-coded information outputted from the coding mode selecting portions 110a to 110n and output respective frequency-band-components of the decoded prediction error signal. The interframe decoding portions 112a to 112n do not output any signal if no coded-information is sent from the coding mode selecting portions 110a to 110n.

The predicted-image-signal band-dividing portion 113 divides a predicted signal read by the motion-compensated predicting portion 107 from the frame memory portion 106 into n pieces of frequency-band-components and outputs the frequency-band-components one to corresponding adding portions 114a to 114n.

The adding portions 114a to 114n add respective frequency-band-components of the predicted image signal outputted from the predicted-image-signal band-dividing portion 113 to corresponding the frequency-band-components of the prediction-error signal outputted from the interframe decoding portions 112 to 112n and output frequency-band-components of the decoded image signal.

The decoded signal selecting portions 115a to 115n are interlocked with the coding mode selecting portions 109a to 109n and 110a to 110n. In the intraframe coding mode, the frequency-band-components of the decoded image from the intraframe decoding portions 111a to 111n are outputted to the synthesizing portion 116 while, in the interframe coding mode, the frequency-band-components of the decoded image from the adding portions 114a to 114n are outputted to the synthesizing portion 116.

The synthesizing portion 116 synthesizes the frequency-band-components of the decoded image outputted from the decoded signal selecting portion 115a to 115n, and outputs a whole decoded image signal.

Figure 4:
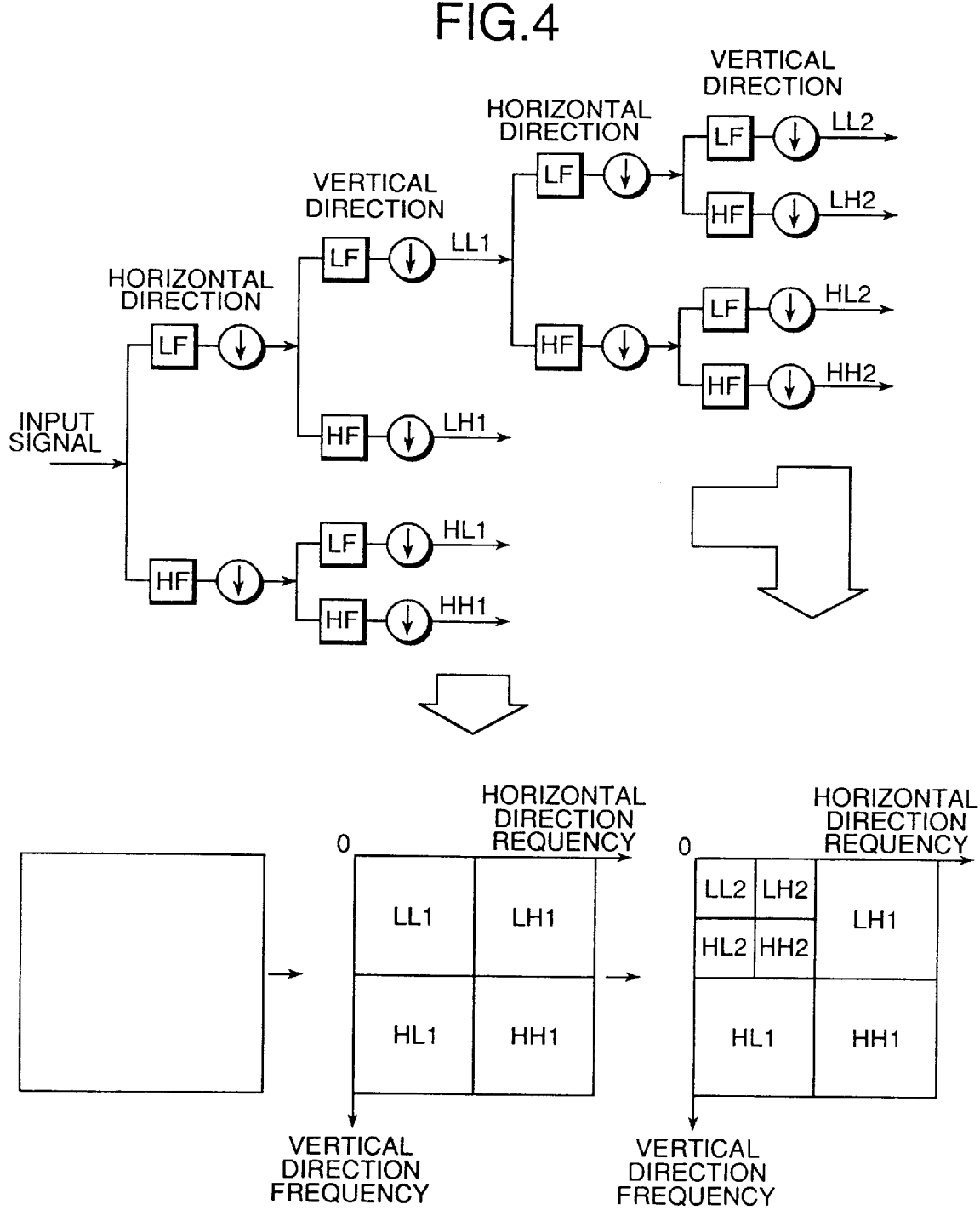
FIG. 4 depicts how to divide an input signal into frequency bands by a band-dividing portion of a video coding device according to the present invention.

FIG. 4 depicts an example of dividing an input image signal into frequency bands in the input-image-signal band-dividing portion 101, the prediction-error-signal band-dividing portion 102 and the predicted-image-signal band-dividing portion 113.

In FIG. 4, an input signal is divided first into 4 frequency bands, two in the horizontal direction and two in the vertical direction, and the lowest band is similarly divided into 4 bands. Namely, the signal is divided into 7 frequency bands.

Referring to FIGS. 5A and 5B, the operation of the video coding device of FIG. 3 is described below.

When an image signal is inputted (at Step 501), the refresh control portion decides which coding mode (i.e., intraframe coding mode or interframe coding mode) to apply for encoding each frequency band and outputs a refresh-command to coding-mode selecting portions 109a to 109n and 111a to 110n and the decoded signal selecting portion 115a to 115n, which correspond to frequency bands of intraframe coding mode (Step 502).

For frequency bands to be encoded in the intraframe coding mode, an input image signal is divided into n pieces of frequency-band-components by and the frequency-band-components are outputted to corresponding intraframe-coding portions 103a to 103n (Step 503). The frequency-band-components of the input image signal outputted from the input-image-signal band-dividing portion 101 are quantized and encoded in each frequency by respective intraframe-coding portions 103a to 103n (Step 504) and outputted through corresponding coding-mode selecting portions 109a to 109n (Step 505).

On the other hand, for frequency bands to be encoded in the interframe coding mode, the motion-compensated predicting portion 107 performs motion-compensated prediction of the input image signal by reference to a preceding image signal that was coded, decoded and stored in the frame memory portion 106, and outputs motion vectors to an external circuit, the difference calculating portion 108 and the predicted-image-signal band-dividing portion 113 respectively (Step 506).

A difference between the input image signal and the predicted image signal read from the frame memory portion 106 is determined by the difference calculating portion 108 and output as a prediction error signal to the prediction-error-signal band-dividing portion 102 (Step 507). This prediction error signal is divided by the prediction-error-signal band-dividing portion 102 into n pieces of frequency-band-components that are transferred to corresponding interframe-coding portions 104a to 104n (Step 508). The interframe-coding portions 104a to 104n quantize and encode respective frequency-band-components of the prediction error, which were outputted from the prediction-error-signal band-dividing portion 102 (Step 509). The coded components of the prediction error are outputted through the coding mode selecting portions 109a to 109n (Step 510).

On the other hand, the respective coded information of the frequency bands outputted from the coding mode selecting portions 109a to 109n, are also transferred to the coding mode selecting portions 110a to 110n which in turn transfer the coded information by intraframe-coding mode in the corresponding frequency band to the intraframe decoding portions 111a to 111n or transfer the coded information by interframe coding mode in the corresponding frequency band to the interframe decoding portions 112a to 112n (Step 511).

The intraframe decoding portions 111a to 111n receive the coded information by intraframe coding mode from the coding-mode selecting portions 110a to 110n, decode the coded information and output the frequency-band-components of the decoded image signal to the decoded image-signal selecting portions 115a to 115n (Step 512).

The interframe decoding portions 112a to 112n receive the coded information by interframe coding mode from the coding-mode selecting portions 110a to 110n, decode the coded information and output the frequency-band-components of the prediction-error signal to the adding portions 114a to 114n (Step 513).

The predicted image-signal read by the motion-compensated predicting portion 107 from the frame-memory portion 106 is divided by the predicted-image-signal band-dividing portion 113 into n pieces of frequency-band-components that are then outputted to the adding portions 114a to 114n respectively in each frequency band (Step 514).

In the adding portions 114a to 114n, each of the prediction-error-signal of the frequency-band-components received from the interframe decoding portions 112a to 112n are added to corresponding predicted image signal of the frequency-band-components received from the predicted-image-signal band-dividing portion 113 to obtain the decoded-image-signal frequency-band-components that are then transferred to the decoded-image-signal selecting portions 115a to 115n (Step 515).

The decoded-image-signal selecting portions 115a to 115n transfer the intraframe-decoded frequency-band-components of the decoded image signal outputted from the intraframe-decoding portions 111a to 111n to the synthesizing portion 116 or transfers the interframe-decoded frequency-band-components of the decoded-image-signal outputted from adding portions 114a to 114n to the synthesizing portion 116.

Each of steps 502 to 515 is performed simultaneously or repeated on n band-components. On completion of the above-mentioned operations on all frequency bands, the frequency-band-components of the decoded image signal from the decoded-image-signal selecting portions 115a to 115n are synthesized as a decoded image signal by the synthesizing portion 116 (Step 516). The decoded image signal synthesized by the synthesizing portion 116 is stored in the frame memory portion 106 and will be used when encoding a subsequent input image signal.

Steps 501 to 516 are repeated until the last input image signal is encoded (Step 517). The processing is then finished.

Referring to FIGS. 6A, 6B and 6C, the method of sending a refresh command from the refresh control portion 105 is described below in detail.

FIG. 6A illustrates an aspect of evenly refreshing respective frequency bands by the refresh control portion 105. The frequency-band-components are periodically refreshed if an unpredictable transmission error and for a lack of information occur.

It is also possible to control a refresh rate for each frequency band. FIG. 6B depicts, by way of example, a refresh-control method that maintains a minimum necessary apparent quality of a decoded image by increasing the low-band refresh-rate and decreasing the high-band refresh-rate because a low-band decoding error may have a considerable influence on the quality of decoded image in appearance.

FIG. 6C depicts another refresh control method that, in view of the fact that the lower frequency band has a larger amount of coded information, refreshes a combination of frequency bands to be refreshed that an amount of codes assigned to refresh in coded information for one screenful (frame) may be always constant.

As mentioned above, the refresh control portion 105 can send a refresh command for separately refreshing each of the frequency bands, so it can realize a variety of refreshing patterns.

Figure 7:
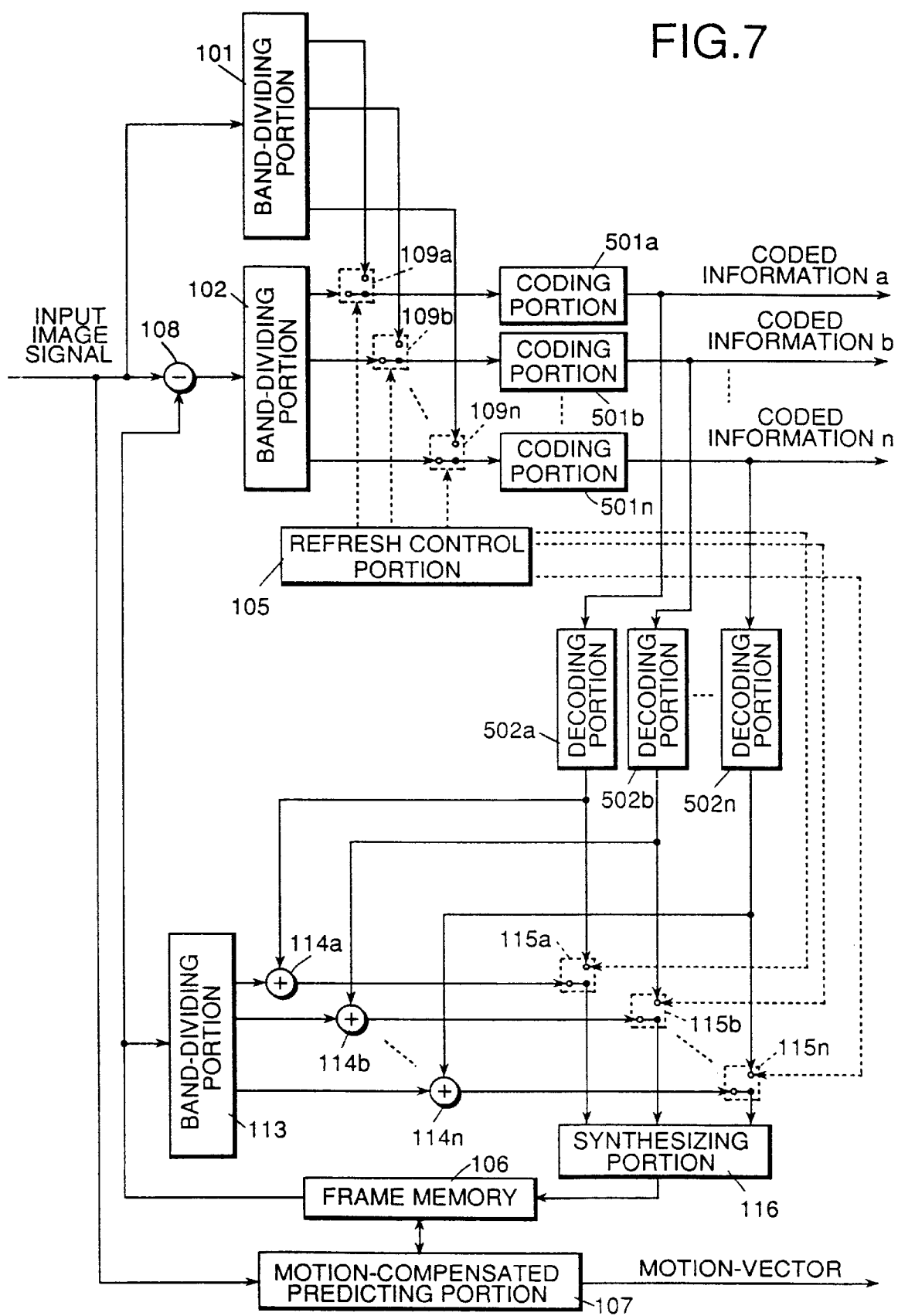
FIG. 7 is a construction block-diagram of a video coding device provided with hierarchical refresh control portion, which device is a second embodiment of the present invention.

Referring now to FIG. 7, a video-coding device according to a second embodiment of the invention is described below.

As shown in FIG. 7, this second embodiment of the present invention comprises an input-image-signal band-dividing portion 101, a prediction-error-signal band-dividing portion 102, a refresh control portion 105, a frame memory portion 106, a motion-compensated interframe-predicting portion 107, a difference calculating portion 108, coding-mode selecting portions 109a to 109n, a predicted-image-signal band-dividing portion 113, adding portions 114a to 114n, decoded signal selecting portions 115a to 115n, a synthesizing portion 116, coding portions 501a to 501n and decoding portions 502a to 502n. The above-mentioned portions of the second embodiment, excepting portions with the same reference numerals as those of the first embodiment portions, will be described below in detail.

The coding portions 501a to 501n receive frequency-band-components of an input-image signal or a prediction-error signal outputted from the coding mode selecting portions 109a to 109n, quantize and encode the received frequency-band-components and output intraframe-coded information of the respective frequency bands or interframe-coded information of the respective frequency bands.

The decoding portions 502a to 502n decode the frequency bands of intraframe-coded information or the frequency bands of an interframe-prediction-coded information from the coding portions 501a to 501n.

Referring to FIGS. 8A and 8B, the sequential operation of the video coding device of FIG. 7 is described below.

When inputting an image signal (Step 801), the input-image-signal band-dividing portion 101 divides an input image signal into frequency-band-components and outputs them to the corresponding coding-mode selecting portions 109a to 109b (Step 802). On the other hand, the motion-compensated predicting portion 107 performs motion-compensated prediction of the input image signal by reference to a preceding image signal that was coded, decoded and stored in the frame memory portion 106, and outputs motion vectors to an external circuit, the difference calculating portion 108 and the predicted-image-signal band-dividing portion 113 respectively (Step 803).

The difference calculating portion 108 calculates a difference between the input image signal and the predicted image signal read from the frame memory portion 106 and outputs the calculated result as a prediction error signal to the prediction-error-signal band-dividing portion 102 (Step 804). This prediction error signal is divided by the prediction-error-signal band-dividing portion 102 into n pieces of frequency-band-components (Step 805) which are then transferred to corresponding coding mode selecting portions 109a to 109n.

The refresh control portion 105 decides a frequency band to be refreshed and outputs a refresh command to corresponding coding-mode selecting portions 109a to 109n and the decoded signal selecting portions 115a to 115n (Step 806).

The coding-mode selecting portions 109a to 109n examine whether a refresh command is received from the refresh control portion 105 (Step 807). When the refresh command exists, the frequency-band-components of the input-image-signal outputted at Step 802 are transferred to the coding portions 501a to 501n that in turn quantize and encode the received the frequency-band-components of the input image signal in the intraframe-coding mode (Step 5808). With no refresh-command, the frequency-band-components of the prediction-error-signal outputted at Step 805 are transferred to the coding portions 501a to 501n that in turn quantize and encode the received the frequency-band-components of the prediction-error signal in the interframe-coding mode (Step 809).

The coded information outputted at Step 808 or 809 from the coding portions 501a to 501n is outputted to an external circuit (Step 810) and, at the same time decoded by the decoding portions 502a to 502n (Step 811) and further processed in either of two following ways depending up on the coding mode (Step 812).

For bands in intraframe coding mode, the decoded signal outputted at Step 811 is transferred without any processing through the decoded signal selecting portions 115a to 115n to the synthesizing portion 116. For bands in interframe coding mode, the predicted-image signal outputted at Step 803 is divided by the predicted-image-signal band-dividing portion 113 into frequency bands (Step 813) which are then added to corresponding outputs from the coding portions 502a to 502n by the adding portions 114a to 114n and transferred through the decoded-signal selecting portions 115a to 115n to the synthesizing portion 116.

The frequency-band-components are processed sequentially or in parallel with one another by Steps 807 to 814. On completion of the above-mentioned operations on all frequency bands, the frequency-band-components of the decoded image signal are synthesized as a decoded image signal by the synthesizing portion 116. The decoded image signal is stored in the frame memory portion 106 and will be used for prediction of a subsequent input image signal (Step 815). Steps 801 to 815 are repeated until the last input image signal is encoded (Step 816). The processing is then finished.

Referring now to FIG. 9, a video-decoding device embodying the present invention is described below.

As shown in FIG. 9, the video-decoding device comprises a refresh control portion 701, coding-mode selecting portions 702a to 702n, intraframe decoding portions 703a to 703n, interframe decoding portion 704a to 704n, a frame memory portion 705, a motion-compensating predicting portion 706, a band-dividing portion 707, adding portions 708a to 708n, decoded-signal selecting portions 709a to 709n and a synthesizing portion 710.

The above-mentioned portions are described below in detail.

The refresh control portion 701 decides which decoding mode, intraframe mode or interframe prediction mode, to apply for decoding each of the frequency bands according to coded information of each frequency band and transfers a refresh command to corresponding coding-mode selecting portions 702a to 702n and the decoded-signal selecting portions 709a to 709n.

The coding-mode selecting portions 702a to 702n transfer the coded information to the intraframe decoding portions 703a to 703n when they detected a refresh command from the refresh control portion 701. These portions transfer the coded information to the interframe decoding portions 704a to 704n when detected no refresh-command.

The intraframe decoding portions 703a to 703n decode the intraframe-coded information outputted from the coding-mode selecting portions 702a to 702n and output frequency-band-components of the decoded image. However, these portions have no output signal if they have not received the coded information from the coding-mode selecting portions 702a to 702n.

The interframe decoding portions 704a to 704n decode the intraframe-prediction coded information outputted from the coding-mode selecting portions 702a to 702n and output frequency-band-components of the decoded-prediction-error signal. However, these portions have no output signal if they have not received the coded information from the coding-mode selecting portions 702a to 702n.

The frame memory portion 705 stores an image signal decoded just before the current signal to be decoded. The motion-compensating portion 706 conducts motion-compensation process by using externally inputted motion-vectors and reads a predicted image signal from the frame memory portion 705.

The band-dividing portion 707 divides a predicted image signal read by the motion-compensating portion 706 from the frame memory portion 705 into n pieces of frequency-band-components and outputs the frequency-band-components to adding portions 708a to 708n respectively.

The adding portions 708a to 708n add respective frequency-band-components of the predicted-image signal outputted from the band-dividing portion 707 to corresponding frequency-band-components of the prediction-error signal outputted from the interframe decoding portions 704a to 704n and output frequency-band-components of the decoded image signal.

Upon receipt of a refresh command from the refresh control portion 701, the decoded-image-signal selecting portions 709a to 709n output frequency-band-components of the decoded-image-signal to the synthesizing portion 710. In the absence of the refresh command, the respective frequency-band-components of the decoded image signal from the adding portions 708a to 708n are outputted to the synthesizing portion 710.

The synthesizing portion 710 synthesizes frequency-band-components of the decoded image outputted from the decoded-image-signal selecting portions 709a to 709n and outputs a synthesized decoded-image signal.

Referring to FIG. 10, the sequential operation of the video decoding device of FIG. 9 is described below.

When hierarchically encoded information is input (Step 101), the refresh control portion 701 reads the coded information of each frequency-band, decides bands to be refreshed and transmits a refresh command to coding-mode selecting portions 702a to 702n corresponding thereto and decoded-image-signal selecting portions 709a to 709n corresponding thereto.

Having detected the refresh command from the refresh control portion 701, the coding-mode selecting portions 702a to 702n transfer the coded information of the bands to be refreshed to the intraframe decoding portions 703a to 703n. When no refresh-command was detected, the coded information is transferred to the interframe decoding portion 704a to 704n (Step 102).

Having received the intraframe-coded information from the coding-mode selecting portions 702a to 702n, the intraframe decoding portions 703a to 703n decode the coded information and output frequency-band-components of the decoded image signal to the decoded-image-signal selecting portions 709a to 709n (Step 103). When there is no output signal from the coding-mode selecting portions 702a to 702n, the decoded-image selecting portion has no output.

On receipt of the interframe-prediction coded information from the coding mode selecting portions 702a to 702n, the interframe decoding portions 704a to 704n decode the coded information and output frequency-band-components of the prediction-error signal to the adding portions 708a to 708n (Step 104).

When no output is given from the coding-mode selecting portions 702a to 702n, the adding portions 708a to 708n have no output signal. On the other hand, the motion-compensating portion 706 reads a predicted-image signal from the frame memory portion 705 by using externally inputted motion-vectors (Step 105).

In the adding portions 708a to 708n, the prediction-error-signal frequency-band-components received from the decoding portions 704a to 704n are added to the corresponding predicted-image-signal frequency-band-components received from the band-dividing potion 707 to obtain the decoded-image-signal frequency-band-components that are then transferred to the decoded-image-signal selecting portions 709a to 709n (Step 107).

The decoded-image-signal selecting portions 709a to 709n output the decoded frequency-band-components of the decoded-image signal outputted from the decoding portions 703a to 703n to the synthesizing portion 710 when detecting a refresh command from the refresh control portion 701. And the decoded-image-signal selecting portions 709a to 709n output the decoded frequency-band-components of the decoded-image-signal outputted from the adding portions 708a to 708n to the synthesizing portion 710 when detecting no refresh-command.

Each of the steps 102 to 107 are simultaneously performed or subsequently repeated on n band-components. On completion of the above-mentioned operations on all frequency bands, the synthesizing portion 710 synthesizes a decoded image signal from frequency-band-components and outputs the decoded image signal to an external circuit (Step 108). This predicted image signal is stored in the frame memory portion 705 to be used for decoding a subsequent hierarchically coded information.

Steps 101 to 108 are repeated until the last coded information is decoded (Step 109). The processing procedure is finished.

As described herein, following aspects are brought according to the present invention.

In one aspect of the present invention, a video coding device provided with hierarchical refreshing control means can intraframe encode respective hierarchical layers by encoding each of frequency bands by changing-over the prediction mode from intraframe prediction to interframe prediction and vice versa.

In another aspect of the present invention, a video coding device provided with hierarchical refreshing control means can separately control changing-over of coding mode from intraframe prediction to interframe prediction and vice versa for each frequency band, thus assuring a high efficiency of refresh cycle.

In still another aspect of the present invention, a video coding device provided with hierarchical refreshing control means periodically changes frequency bands to be refreshed one to another for evenly refreshing every frequency band, thus enabling periodical elimination of a transmission error caused in any frequency band.

In a further aspect of the present invention, a video coding device provided with hierarchical refreshing control means can adaptively control a refresh rate for each of the frequency bands, so realizing the effective refreshment for improving an subjective quality of decoded video sequence by increasing refresh rate of low-frequency bands.

In a still further aspect of the present invention, a video coding device provided with hierarchical refreshing control means can adaptively select hierarchical layers so that they may be refreshed at a substantially constant amount of coded information, i.e., a minimized change in the number of coded information when refreshing.

In another aspect of a video decoding device of the present invention, a video decoding device provided with hierarchical refreshment can be efficiently controlled by decoding each of the frequency bands by changing-over the prediction mode from intraframe prediction to intraframe prediction and vice versa.

We claim:

1. A video coding device, comprising:

a motion-compensated predicting portion for performing motion-compensated interframe-prediction for an input digital video signal to obtain a prediction-image signal;

a first band-dividing portion for dividing said input digital video signal into a plurality of frequency band components;

a second band-dividing portion for dividing a signal resulting from a difference between said input digital video signal and said prediction-image signal into a plurality of frequency band components;

a plurality of intraframe coding portions for intraframe encoding each of said plurality of frequency band components received from said first band-dividing portion;

a plurality of interframe coding portions for interframe encoding each of said plurality of frequency band components received from said second band-dividing portion, wherein each of said plurality of intraframe and interframe encoded frequency band components are output to an external circuit via a plurality of coding mode selecting portions corresponding to each of said plurality of frequency band components; and a hierarchical refresh control portion for determining whether said plurality of frequency band components are to be interframely or intraframely encoded by outputting a refresh commands to said corresponding code mode selecting portions, whereupon each of said received plurality of frequency band components are encoded by the selected intraframe or interframe coding portion for output to said external circuit.

2. A video-coding device as defined in claim 1, said hierarchical refreshing control portion controlling a changing-over of encoding mode between intraframe encoding and interframe encoding independently for each frequency band.

3. A video-coding device as defined in claim 1, said hierarchical refreshing control portion periodically changing frequency bands to be intraframe encoded so that every frequency band is refreshed with equal frequency.

4. A video-coding device as defined in claim 1, said hierarchical refreshing control portion adaptively changing the frequency of intraframe encoding in each of said frequency bands.

5. A video-coding device as defined in claim 1, said hierarchical refreshing control portion adaptively selecting frequency bands to be intraframe encoded so that they may be intraframe encoded at a constant amount of coded information.

6. A video-decoding device, comprising:

a plurality of coding mode selecting portions receiving encoded information of each frequency band component of a video signal, each of said plurality of coding mode selecting portions corresponding to an intraframe or interframe decoding portion;

a hierarchical refresh control portion reading said encoded information of each frequency band component, selecting which of said received encoded information of said frequency bands are to be intraframe encoded, and transmitting a refresh command to at least one of said plurality of coding mode selecting portions, wherein if a coding mode selecting portion detects a refresh command, said coding mode selecting portion transfers said encoded information of said selected frequency bands to said corresponding intraframe decoding portion, and wherein said code mode selecting transfers said encoded information of said selected frequency band transferred to said corresponding interframe decoding portion if no refresh signal is detected.

7. A video coding device, comprising:

a plurality of interframe and intraframe coding portions for interframe or intraframe encoding each of a plurality of frequency band components received as a band-divided digital video signal, wherein each of said plurality of encoded frequency band components are output to an external circuit via a plurality of corresponding encoding mode selecting portions; and a hierarchical refresh control portion for determining and controlling whether each of said plurality of frequency band components are to be interframe or intraframe encoded by outputting refresh commands to said corresponding encoding mode selecting portions, whereupon each of said received plurality of frequency band components are encoded by the selected intraframe or interframe coding portion for output as coded information to said external circuit, said hierarchical refresh control portion periodically changing frequency band components to be intraframe encoded so that each frequency band component is refreshed with equal frequency.

8. A video coding device, comprising:

a plurality of interframe and intraframe coding portions for interframe or intraframe encoding each of a plurality of frequency band components received as a band-divided digital video signal, wherein each of said plurality of encoded frequency band components are output to an external circuit via a plurality of coding mode selecting portions corresponding to each of said plurality of frequency components; and a hierarchical refresh control portion for determining and controlling whether each of said plurality of frequency band components are to be interframe or intraframe encoded by outputting refresh commands to said corresponding coding mode selecting portions, whereupon each of said received plurality of frequency band components are encoded by the selected intraframe or interframe coding portion for output as coded information to said external circuit, said hierarchical refresh control portion adaptively changing the frequency band to be intraframe encoded within each of said frequency band components.

9. A video coding device, comprising:

a plurality of interframe and intraframe coding portions for interframe or intraframe encoding each of a plurality of frequency band components received as a band-divided digital video signal, wherein each of said plurality of encoded frequency band components are output to an external circuit via a plurality of coding mode selecting portions corresponding to each of said plurality of frequency components; and a hierarchical refresh control portion for determining and controlling whether each of said plurality of frequency band components are to be interframely or intraframely encoded by outputting refresh commands to said corresponding coding mode selecting portions, whereupon each of said received plurality of frequency band components are encoded by the selected intraframe or interframe coding portion for output as coded information to said external circuit, said hierarchical refresh control portion adaptively selecting frequency bands to be intraframe encoded so that they may be intraframe encoded at a constant amount of coded information.

* * * * *